(12) United States Patent
Boulton

(10) Patent No.: US 11,392,686 B2
(45) Date of Patent: Jul. 19, 2022

(54) DETECTING STACK COOKIE UTILIZATION IN A BINARY SOFTWARE COMPONENT USING BINARY STATIC ANALYSIS

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 420 days.

(21) Appl. No.: 16/209,457

(22) Filed: Dec. 4, 2018

(65) Prior Publication Data

US 2019/0205527 A1 Jul. 4, 2019

Related U.S. Application Data

(60) Provisional application No. 62/612,972, filed on Jan. 2, 2018.

(51) Int. Cl.

| | | |
|---|---|---|
| *G06F 11/00* | (2006.01) | |
| *G06F 12/14* | (2006.01) | |
| *G06F 12/16* | (2006.01) | |
| *G06F 21/52* | (2013.01) | |
| *G06F 21/57* | (2013.01) | |
| *G06F 8/41* | (2018.01) | |
| *G06F 21/56* | (2013.01) | |
| *G06F 21/54* | (2013.01) | |
| *G06F 21/12* | (2013.01) | |

(52) U.S. Cl.
CPC .............. *G06F 21/52* (2013.01); *G06F 8/41* (2013.01); *G06F 21/125* (2013.01); *G06F 21/54* (2013.01); *G06F 21/566* (2013.01); *G06F 21/577* (2013.01)

(58) Field of Classification Search
CPC .......... G06F 21/52; G06F 8/41; G06F 21/125; G06F 21/54; G06F 21/566; G06F 21/577
See application file for complete search history.

(56) References Cited

U.S. PATENT DOCUMENTS

2005/0144471 A1* 6/2005 Shupak ................... G06F 21/52
713/193
2007/0006170 A1* 1/2007 Hasse ................... G06F 11/366
717/131

(Continued)

OTHER PUBLICATIONS

Communication Pursuant to Article 94 (3) EPC issued in European Application No. 18214100.2 on May 8, 2020, 5 pages.

(Continued)

*Primary Examiner* — Darshan I Dhruv
(74) *Attorney, Agent, or Firm* — Fish & Richardson P.C.

(57) ABSTRACT

Systems, methods, and software can be used to detect stack cookie utilization in a binary software component using binary static analysis. In some aspects, one computer-implemented method includes identifying a function defined in the binary software component, the function including one or more instructions; performing a binary static analysis of the function to determine whether the function utilizes stack cookie protection based on the one or more instructions including one or more stack cookie handling instructions; and in response to determining that the function utilizes stack cookie protection, updating a security report for the binary software component to indicate that the function utilizes stack cookie protection.

20 Claims, 4 Drawing Sheets

(56) References Cited

U.S. PATENT DOCUMENTS

| | | | |
|---|---|---|---|
| 2007/0089088 A1* | 4/2007 | Borde | G06F 21/52 |
| | | | 717/106 |
| 2008/0140884 A1* | 6/2008 | Enbody | G06F 21/54 |
| | | | 710/57 |
| 2012/0297485 A1* | 11/2012 | Maeda | G06F 21/56 |
| | | | 726/23 |
| 2016/0028767 A1 | 1/2016 | Ripoll et al. | |
| 2016/0212159 A1* | 7/2016 | Gupta | H04L 63/1416 |
| 2017/0090929 A1* | 3/2017 | Muttik | G06F 11/302 |
| 2017/0132419 A1* | 5/2017 | Gupta | G06F 8/65 |
| 2019/0173923 A1* | 6/2019 | Skowyra | H04L 63/1433 |

OTHER PUBLICATIONS

Extended European Search Report issued in European Application No. 18214100.2 dated Jul. 5, 2019, 10 pages.
El Dien et al. [online], "Buffer Overflow Velnerability Detection in the Binary Code," Jan. 1, 2011, [retrieved on Dec. 13, 2018], retrieved from: URL<https://pdfs.semanticscholar.org/ca15/52428d06ba6cdccf02c10f3c348813d96258.pdf>, 9 pages.
Extended European Search Report issued in European Application No. 18214100.2 dated May 9, 2019, 9 pages.
No Author [online], "Checksec.sh—GitHub—Version 4e313e6, Dec. 12, 2017," Dec. 12, 2017, [retrieved on Jan. 30, 2019], retrieved from: URL<https://github.com/slimm609/checksec.sh/blob/4e313e6509888359925dc892494fc353f02842aa/checksec>, 21 pages.

* cited by examiner

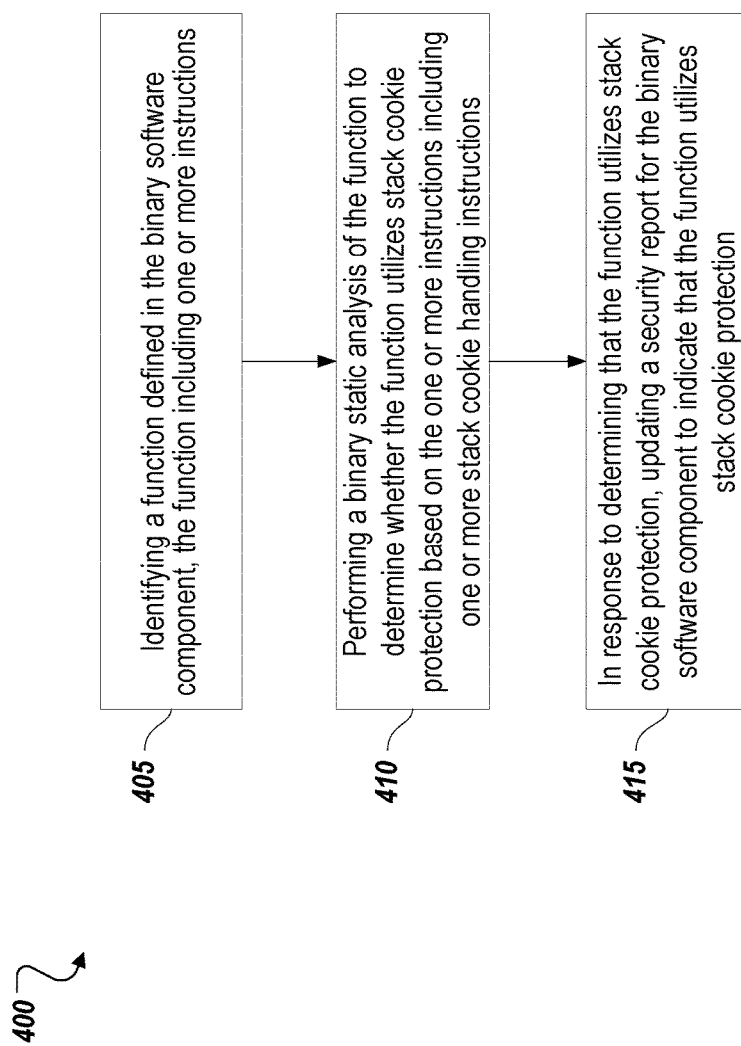

DETECTING STACK COOKIE UTILIZATION IN A BINARY SOFTWARE COMPONENT USING BINARY STATIC ANALYSIS

CROSS REFERENCE TO RELATED APPLICATIONS

This application claims the benefit of priority of U.S. Application Ser. No. 62/612,972, filed on Jan. 2, 2018, which is incorporated by reference herein in its entirety.

TECHNICAL FIELD

The present disclosure relates to detecting stack cookie utilization in a binary software component using binary static analysis.

BACKGROUND

An execution stack (also referred to as simply a "stack") is a section of memory used to store information about the current execution context of a software program. For example, the stack of a software program may include information about the currently executing function (known as the function's "stack frame") such as local variables, a return address indicating the function that called the currently executing function (to which control is to be returned when the currently executing function finishes), and other information.

DESCRIPTION OF DRAWINGS

FIG. 4 is a flow diagram showing a method for detecting stack cookie utilization in a binary software component using binary static analysis, according to an implementation.

Like reference numbers and designations in the various drawings indicate like elements.

DETAILED DESCRIPTION

Figure 1:
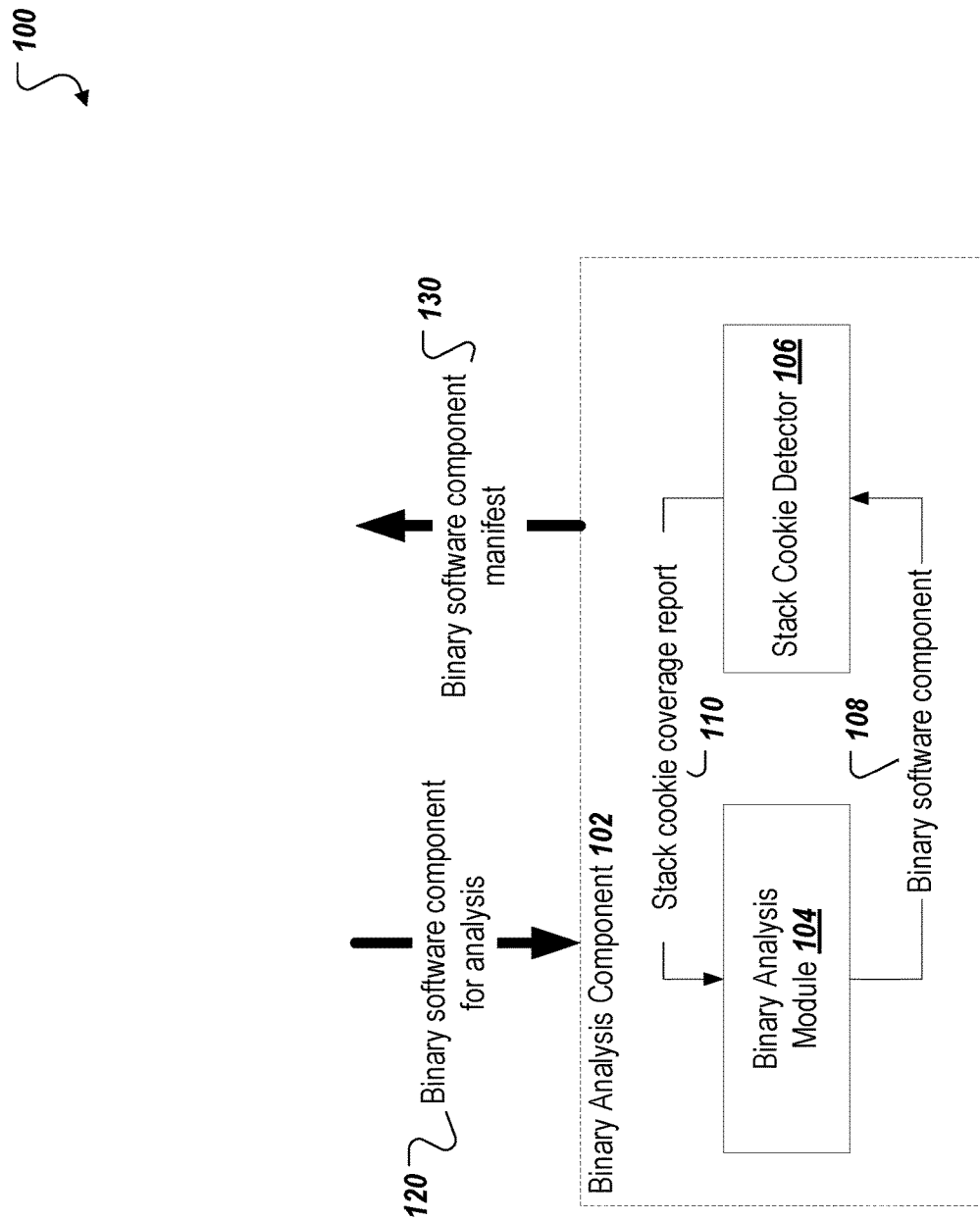
FIG. 1 is a schematic diagram showing a system that detects stack cookie utilization in a binary software component using binary static analysis, according to an implementation.

In some cases, software programs may execute in systems connected to, or accessible via, public networks such as the Internet. Malicious actors can use various exploitative techniques to influence the behavior of a network-connected software program by manipulating the program's stack. One such technique, known as a buffer overflow attack, involves an attacker sending data to a software program that does not check the size of data it receives before copying the data into a fixed size memory location (e.g., a buffer). By sending a specially formatted data string of the correct length, the attacker can overwrite the stack memory adjacent to the buffer with arbitrary data. Using this technique, the attacker can take control of the computer upon which the software program executes, and cause it to execute arbitrary instructions.

Several techniques have been developed to mitigate against such attacks. One technique, known as "stack cookies," involves placing a special value or "cookie" on the stack at a boundary between a function's local data and information (such as the return address) used to maintain the organization of the stack. When the function returns, the stack location where the cookie was stored is checked to ensure that the value has not been overwritten (e.g., by a buffer overflow attack). If the value in the stack location matches the cookie value, the stack has not been overwritten, and the program continues executing. If the value in the stack location does not match the cookie value, the stack has been overwritten and the program exits. This technique effectively prevents an attacker from utilizing a buffer overflow attack to inject arbitrary instructions, as such an attack will overwrite the cookie value and cause the program to exit before executing the injected instructions. However, if the user of the software component does not have access to its source code, which is often the case if the software is provided by an external vendor, it can be challenging for the user to verify that the software component actually implements stack cookie protection. Compiler programs used to build other software programs generally add metadata to the software programs indicating which features, such as stack cookies, are compiled into the program. However, this metadata is not always reliable, as some compilers may not include stack cookie protection in every function in a program. The metadata can also be altered to indicate that stack cookie protection is included in the program when in fact it is not.

The present disclosure describes techniques for detecting stack cookie utilization in a binary software component using binary static analysis. In one implementation, identifying a function defined in the binary software component is identified. The function includes one or more instructions. A binary static analysis of the function is performed to determine whether the function utilizes stack cookie protection based on the one or more instructions including one or more stack cookie handling instructions. Binary static analysis involves examining a binary software component (e.g., one that has been compiled) and determining characteristics of the program from its binary structure alone, without executing the binary software component or examining its source code. In response to determining that the function utilizes stack cookie protection, a security report for the binary software component is updated to indicate that the function utilizes stack cookie protection.

FIGS. 1-4 and associated descriptions provide additional details of these implementations. These approaches provide a mechanism to increase the overall software quality of a system by verifying the use of stack cookies in a binary software component rather than trusting possibly misleading indications in the component's metadata. In addition, the techniques described herein do not require access to the component's source code, allowing a user of the software to perform the verification independent of the software vendor.

FIG. 1 is a schematic diagram showing a system 100 that detects stack cookie utilization in a binary software component using binary static analysis, according to an implementation. The system 100 includes a binary analysis component 102 including a binary analysis module 104 and a stack cookie detector 106.

The binary analysis component 102 comprises a system for performing binary static analysis on software components to determine security characteristics of the components. The binary analysis component 102 can include one or more computing devices executing software programs to perform the binary static analysis of software components and to determine the corresponding security characteristics.

Binary static analysis involves examining the binary representation of a compiled binary software component to determine its attributes and to deduce its possible behaviors upon execution. Binary static analysis is performed without reference to the source code that was compiled to create the binary software component, and is generally performed without executing the binary software component. For example, a software program can perform binary static analysis on a binary software component by examining the structure of the binary data making up the binary software component. The binary static analysis program can identify attributes of the binary software component by examining an information header included in the binary software component by the compiler that created the component. The binary static analysis program can also identify attributes of the binary software component by examining the structure of the program itself, such as, for example, by identifying functions defined in the program, APIs used by the program, compiler defensive techniques implemented in the functions defined in the program, and other features of the binary software component.

The binary analysis module 104 comprises a module within the binary analysis component 102 for performing the binary static analysis described above. In some cases, the binary analysis module 104 may examine the structure of a binary software component to be analyzed, and may utilize other components (such as the stack cookie detector 106 discussed below) within the binary analysis component 102 to perform certain types of analysis on the binary software component. In some cases, the binary analysis module 104 may be a software component within the binary analysis component, such as a class, a library, a function, an object, or other type of software component.

Stack cookie detector 106 comprises a module within the binary analysis component 102 that analyzes a binary software component to determine which functions defined in the binary software component implement stack cookie protection. As described in greater detail below, the stack cookie detector 106 may examine the instructions inside each function defined in the binary software component to determine whether the function includes instructions to place a stack cookie value on the stack when the function is called, and instructions to check whether the stack cookie value has been altered when the function returns. In some cases, the stack cookie detector 106 may receive as input the location of a single identified function within the binary software component, and may return an indication of whether the identified function implements stack cookie protection. Stack cookie detector 106 may also receive as input a function map for the binary software component indicating the locations of functions defined within the component, and may iterate through each function to produce an indication of whether the function implements stack cookie protection.

As shown, the binary analysis component 102 receives a binary software component for analysis (120). The binary software component may be provided to the binary analysis component 102 by an external system, such as, for example, a software development system, software deployment system, or other systems. The binary analysis module 104 may analyze the received binary software component, and provide the binary software component to the stack cookie detector 106 for analysis (108). The stack cookie detector 106 may analyze functions defined in the binary software component to determine whether the functions implement stack cookie protection, and provide a stack cookie coverage report 110 to the binary analysis module 104 including these indications.

In some cases, stack cookie coverage report 110 may be included in a security manifest produced by the binary analysis component 102 for the binary software component. The binary analysis component 102 may provide the security manifest to an external system, as shown at 130. The external system may use the security manifest to make decisions regarding the binary software component. For example, the external system may choose not to deploy a binary software component where the security manifest indicates that the component includes functions that do not implement stack cookie protection.

Figure 2:
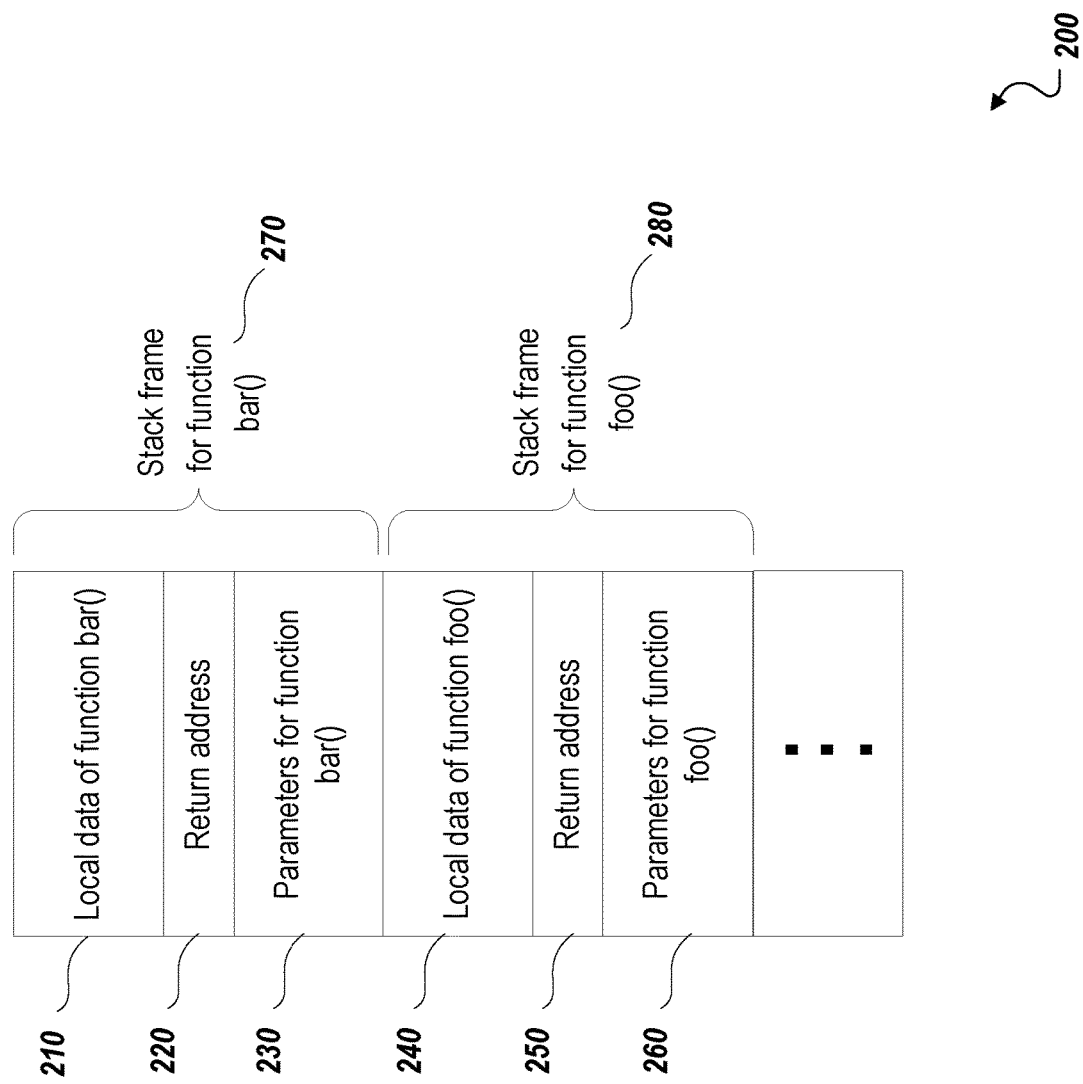
FIG. 2 illustrates an example execution stack, according to an implementation.

FIG. 2 illustrates an example execution stack 200, according to an implementation. The execution stack 200 includes stack frames 270, 280, local data 210, 240, return addresses 220, 250, and function parameters 230, 260.

Execution stack 200 represents a simplified execution stack for an executing binary software component in which a function called "foo( )" has called a function called "bar( )." Function foo( ) is associated with stack frame 280 within the execution stack 200. Stack frame 280 includes function parameters 260 that were passed to the function foo( ) when it was called (i.e., by another function, not shown). Stack frame 280 also includes a return address 250, which is a pointer to a stack frame associated with the function that called foo( ). Stack frame 280 also includes local data 240. Local data 240 includes any local variables defined in the function foo( ). For example, if the function foo( ) defined a string of length 10, the local data 240 would include a section of memory large enough to store 10 characters, and any valued copied into this string during execution would be copied into this section of memory within local data 240.

Function bar( ) is associated with stack frame 270 within the execution stack 200. Stack frame 270 includes function parameters 230 that were passed to the function bar( ) when it was called by function foo( ). Stack frame 270 also includes a return address 220, which is a pointer to a stack frame associated with the function that called bar( ). In this case, return address 220 would point to the beginning of stack frame 280 associated with function foo( ), because function foo( ) called function bar( ). When function bar( ) returns, stack cleanup instructions (including in the function epilogue for function bar( )) would read the return address 220 from the stack, remove stack frame 270 from the stack, and cause execution to jump to the address noted by return address 220. Because function foo( ) called function bar( ), this would cause execution to jump to the instruction in function foo( ) immediately after the call to function bar( ), and execution would continue inside function foo( ). Local data 210 includes any local variables defined in the function bar( ). For example, if the function bar( ) defined a string of length 10, the local data 210 would include a section of memory large enough to store 10 characters, and any valued copied into this string during execution would be copied into this section of memory within local data 210.

Figure 3:
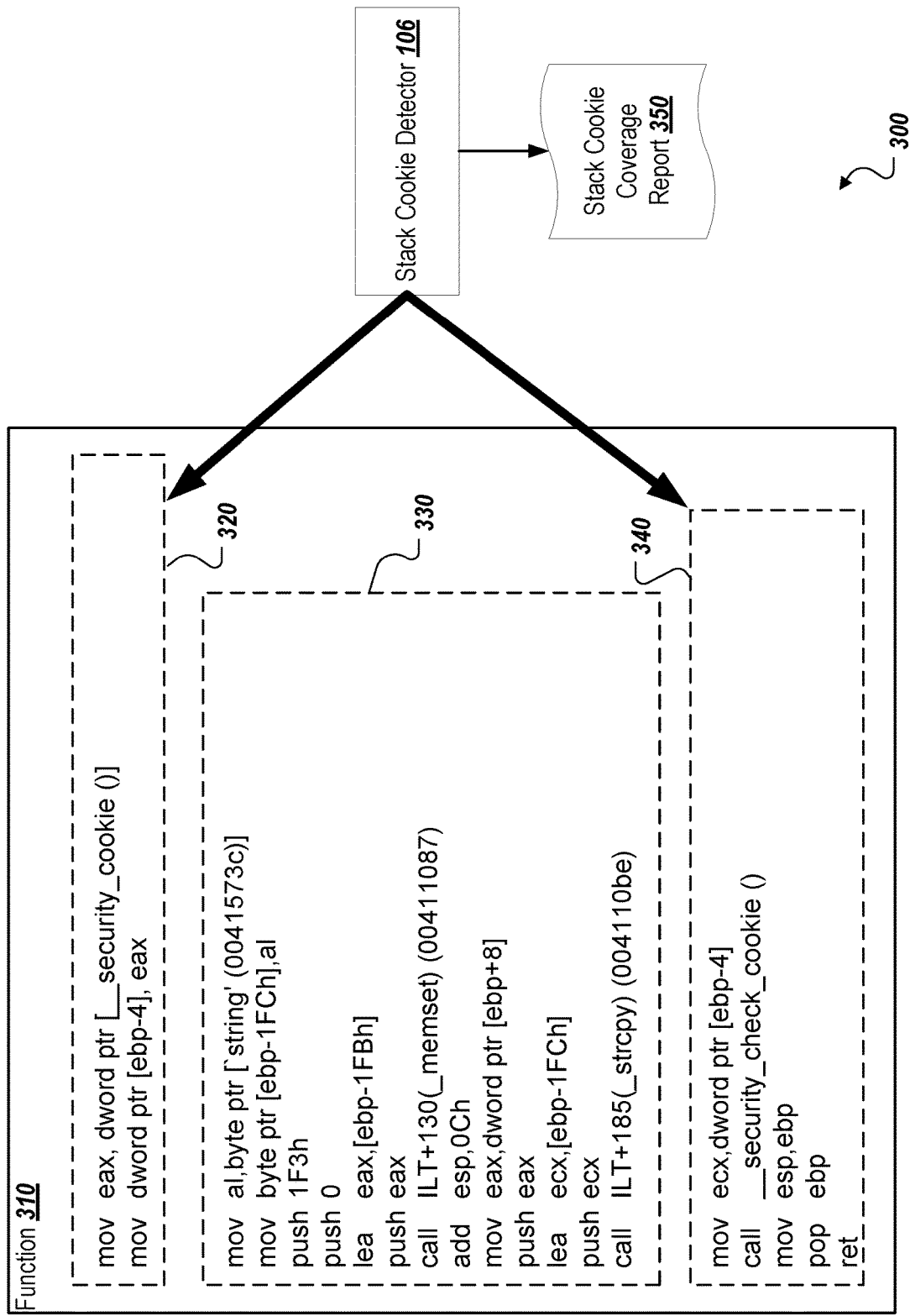
FIG. 3 illustrates an example disassembled function analyzed to determine whether it includes stack cookie protection, according to an implementation.

FIG. 3 illustrates a system 300 in which a disassembled function 310 is analyzed to determine whether it includes stack cookie protection, according to an implementation. Disassembled function 310 includes a function prologue 320, function body 330, and a function epilogue 340.

Disassembled function 310 may be function within a binary software component that has been identified using binary static analysis, as described above. As shown, function 310 includes a number of assembly language instructions. During execution of the binary software component, when function 310 is called, the assembly language instructions included in function 310 are executed. The instructions within function 310 may include instructions from one or more instruction sets, such as, for example, the ARM instruction set, the THUMB instruction, an Intel instruction set, a Zilog instruction set, or other types of instruction sets.

Function prologue 320 includes instructions that will be executed when function 310 is called during execution. In some cases, function prologue 320 includes stack cookie instructions configured to insert a stack cookie value to mark the boundary of function 310's local data within the stack. Function prologue 320 may call an external function to retrieve the stack cookie value for insertion into the stack, such as the "_security_cookie ( )" function called in the first instruction in function prologue 320.

Function epilogue 340 includes instructions that will be executed when function 310 returns after being called during execution. In some cases, function epilogue 340 includes stack cookie instructions configured to check whether the stack cookie value written to the stack by the stack cookie instructions in the function prologue 320 is still present in the stack at the boundary of function 310's local data. Function epilogue 340 may call an external function to whether the value at this stack location matches the stack cookie value written by the function prologue 320, such as the "_security_check_cookie ( )" function called in function prologue 340.

Stack cookie detector 106 may examine the function prologue 320 to determine whether it contains instructions to retrieve the stack cookie value and insert it into the stack, such as the call to _security_cookie( ) in the function prologue 320. If the stack cookie detector 106 determines that such a stack cookie instruction is present in function 310, the stack cookie detector 106 may then examine the function epilogue to determine whether it contains instructions to retrieve the value from the expected stack cookie location within the stack, and compare the retrieved value to the stack cookie value written by the instructions in the function prologue 320. In some cases, if stack cookie detector 106 determines that the function prologue 320 includes instructions to write a stack cookie to the stack, and function epilogue 340 includes instructions to retrieve and check the value of the stack cookie from the stack, stack cookie detector 106 may determine that function 310 implements stack cookie protection. Stack cookie detector 106 may then update a stack cookie coverage report 350 to indicate that function 310 implements stack cookie protection. In some cases, the stack cookie coverage report 350 may be part of a security manifest for the binary software component include function 310.

FIG. 4 is a flow diagram showing a method 400 for detecting stack cookie utilization in a binary software component using binary static analysis, according to an implementation. At 405, identifying a function including one or more instructions and defined in the binary software component is identified by a binary analysis component (e.g., 102).

At 410, a binary static analysis of the function is performed by a stack cookie detector (e.g., 106) to determine whether the function utilizes stack cookie protection based on the one or more instructions including one or more stack cookie handling instructions. In some cases, the one or more stack cookie handling instructions are configured, when executed by a processor, to insert a particular data sequence into an execution stack maintained by the processor when the function is called to mark a boundary of stack data associated with the function. The particular data sequence may be generated at compile time, or the one or more stack cookie handling instructions may include an instruction to generate the particular data sequence when the function is called. In some cases, the one or more stack cookie handling instructions are configured, when executed by the processor, to determine whether the particular data sequence remains in the execution stack when the function returns after the function is called. The one or more stack cookie handling instructions may be configured, when executed by the processor, to cause execution of the binary software component to halt in response to determining that the particular data sequence does not remain in the execution stack when the function returns.

At 415, in response to determining that the function utilizes stack cookie protection, a security report for the binary software component is updated by the stack cookie detector (e.g., 106) to indicate that the function utilizes stack cookie protection. In some cases, in response to determining that the function does not utilize stack cookie protection, a security report for the binary software component is updated to indicate that the function does not utilize stack cookie protection.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service users using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
   identifying a function defined in a binary software component, the function including one or more instructions;
   performing a binary static analysis of the function to determine whether the function utilizes stack cookie protection based on whether the one or more instructions include one or more stack cookie handling instructions, wherein the stack cookie protection comprises a placement of a cookie value on a stack at a boundary between a function's local data and information used to maintain an organization of the stack, and wherein performing a binary static analysis of the function to determine whether the function utilizes stack cookie protection comprises:
      examining a function prologue of the function to detect whether the function includes one or more stack cookie handling instructions; and
   in response to determining that the function utilizes stack cookie protection, updating a security report for the binary software component to indicate that the function utilizes stack cookie protection.

2. The method of claim 1, further comprising:
   in response to determining that the function does not utilize stack cookie protection, updating a security report for the binary software component to indicate that the function does not utilize stack cookie protection.

3. The method of claim 1, wherein the one or more stack cookie handling instructions are configured, when executed by a processor, to insert a particular data sequence into an execution stack maintained by the processor when the function is called to mark a boundary of stack data associated with the function.

4. The method of claim 3, wherein the particular data sequence is generated at compile time.

5. The method of claim 3, wherein the one or more stack cookie handling instructions include an instruction to generate the particular data sequence when the function is called.

6. The method of claim 3, wherein the one or more stack cookie handling instructions are configured, when executed by the processor, to determine whether the particular data sequence remains in the execution stack when the function returns after the function is called.

7. The method of claim 6, wherein the one or more stack cookie handling instructions are configured, when executed by the processor, to cause execution of the binary software component to halt in response to determining that the particular data sequence does not remain in the execution stack when the function returns.

8. A computing device, comprising:
at least one hardware processor;
a non-transitory computer-readable storage medium coupled to the at least one hardware processor and storing programming instructions for execution by the at least one hardware processor, wherein the programming instructions, when executed, cause the at least one hardware processor to perform operations comprising:
determining that a binary software component was compiled with stack cookie functionality enabled based on metadata included with the binary software component;
identifying a function defined in the binary software component, the function including one or more instructions;
performing a binary static analysis of the function to determine whether the function utilizes stack cookie protection based on whether the one or more instructions include one or more stack cookie handling instructions, wherein the stack cookie protection comprises a placement of a cookie value on a stack at a boundary between a function's local data and information used to maintain an organization of the stack, and wherein performing a binary static analysis of the function to determine whether the function utilizes stack cookie protection comprises:
examining a function prologue of the function to detect whether the function includes one or more stack cookie handling instructions; and
in response to determining that the function utilizes stack cookie protection, updating a security report for the binary software component to indicate that the function utilizes stack cookie protection.

9. The computing device of claim 8, the operations further comprising:
in response to determining that the function does not utilize stack cookie protection, updating a security report for the binary software component to indicate that the function does not utilize stack cookie protection.

10. The computing device of claim 8, wherein the one or more stack cookie handling instructions are configured, when executed by a processor, to insert a particular data sequence into an execution stack maintained by the processor when the function is called to mark a boundary of stack data associated with the function.

11. The computing device of claim 10, wherein the particular data sequence is generated at compile time.

12. The computing device of claim 10, wherein the one or more stack cookie handling instructions include an instruction to generate the particular data sequence when the function is called.

13. The computing device of claim 10, wherein the one or more stack cookie handling instructions are configured, when executed by the processor, to determine whether the particular data sequence remains in the execution stack when the function returns after the function is called.

14. The computing device of claim 13, wherein the one or more stack cookie handling instructions are configured, when executed by the processor, to cause execution of the binary software component to halt in response to determining that the particular data sequence does not remain in the execution stack when the function returns.

15. One or more non-transitory computer-readable media containing instructions which, when executed, cause a computing device to perform operations comprising:
determining that a binary software component was compiled with stack cookie functionality enabled based on metadata included with the binary software component;
identifying a function defined in the binary software component, the function including one or more instructions;
performing a binary static analysis of the function to determine whether the function utilizes stack cookie protection based on whether the one or more instructions include one or more stack cookie handling instructions, wherein the stack cookie protection comprises a placement of a cookie value on a stack at a boundary between a function's local data and information used to maintain an organization of the stack, and wherein performing a binary static analysis of the function to determine whether the function utilizes stack cookie protection comprises:
examining a function prologue of the function to detect whether the function includes one or more stack cookie handling instructions; and
in response to determining that the function utilizes stack cookie protection, updating a security report for the binary software component to indicate that the function utilizes stack cookie protection.

16. The one or more computer-readable media of claim 15, the operations further comprising:
in response to determining that the function does not utilize stack cookie protection, updating a security report for the binary software component to indicate that the function does not utilize stack cookie protection.

17. The one or more computer-readable media of claim 15, wherein the one or more stack cookie handling instructions are configured, when executed by a processor, to insert a particular data sequence into an execution stack maintained by the processor when the function is called to mark a boundary of stack data associated with the function.

18. The one or more computer-readable media of claim 17, wherein the particular data sequence is generated at compile time.

19. The one or more computer-readable media of claim 17, wherein the one or more stack cookie handling instructions include an instruction to generate the particular data sequence when the function is called.

20. The one or more computer-readable media of claim 17, wherein the one or more stack cookie handling instructions are configured, when executed by the processor, to determine whether the particular data sequence remains in the execution stack when the function returns after the function is called.

* * * * *